United States Patent [19]
Divan

[11] 3,910,141
[45] Oct. 7, 1975

[54] APPARATUS FOR SLICING FOOD PRODUCT AND SEPARATING DRAFTS OF SLICES

[75] Inventor: William J. Divan, Centerport, N.Y.

[73] Assignee: Cashin Systems Corporation, Williston Park, N.Y.

[22] Filed: Aug. 16, 1974

[21] Appl. No.: 498,175

[52] U.S. Cl. .................. 83/26; 83/42; 83/88; 83/89; 83/355
[51] Int. Cl.² .......................................... B26D 4/46
[58] Field of Search .............. 83/26, 27, 42, 88, 89, 83/90, 91, 355; 177/120; 53/59 W

[56] References Cited
UNITED STATES PATENTS

| | | | |
|---|---|---|---|
| 2,073,082 | 3/1937 | Walter | 83/88 |
| 2,426,835 | 9/1947 | Mahler | 83/88 |
| 2,870,810 | 1/1959 | Folk | 83/88 |
| 3,015,350 | 1/1962 | Reichel et al. | 83/88 |
| 3,200,864 | 8/1965 | Gillman | 83/89 X |
| 3,204,676 | 9/1965 | Gillman | 83/73 |
| 3,846,957 | 11/1974 | Divan | 83/89 X |

*Primary Examiner*—Frank T. Yost
*Attorney, Agent, or Firm*—Kane, Dalsimer, Kane, Sullivan and Kurucz

[57] ABSTRACT

A slicing machine for feeding a substantially rectangular processed meat product, similar in section to bacon, into a continuously rotating slicing machine which feeds the slices onto a motorized conveyor in shingled fashion. When a desired number of shingled slices (a draft) for example three, are fed onto the motorized conveyor, the feed into the slicing machine is stopped and the slicer is rotated a desired number of revolutions, for example equivalent to two slices. During this two slice period the motorized conveyor is jumped ahead at high speed. The stopping of the feed and the speed up of the motorized conveyor results in shingled slices with separations between each draft (three) on the motorized conveyor. By feeding these slices onto a faster moving conveyor the drafts of shingled slices can be completely separated for subsequent processing and packaging.

5 Claims, 2 Drawing Figures

APPARATUS FOR SLICING FOOD PRODUCT AND SEPARATING DRAFTS OF SLICES

BACKGROUND OF THE INVENTION

The present invention relates to improvements in apparatus for slicing processed meat products, similar in section to bacon, and arranging the slices in shingled form on a continuously moving conveyor with separations between each draft of shingled slices. Heretofore this has been accomplished by stopping the feed for a certain number of revolutions of the slicer, depending on the separation desired between shingled drafts on the conveyor.

Slicing apparatus of the type described herein is being marketed by Cashin Systems Corp., Williston Park, N.Y., and is disclosed in commonly assigned U.S. Pat. Nos. 2,903,032, granted Sept. 8, 1959; 2,969,099, granted Jan. 23, 1961; 3,027,924 granted Apr. 3, 1962; and 3,204,676 granted Sept. 7, 1965.

The apparatus of the present invention is an improvement over the stop-and-go slicing performed on the prior machines and achieves the desired result without cutting down the production rate.

SUMMARY OF THE INVENTION

Accordingly, it is a principal object of the present invention to provide an improved and more efficient apparatus for slicing and grouping slices of food product, such as processed meat products, in shingled form with separations between drafts of shingled slices.

Other objects and advantages will become apparent from the following detailed description which is to be taken in conjunction with the accompanying drawings.

DETAILED DESCRIPTION

Slicing Machine

Figure 1:
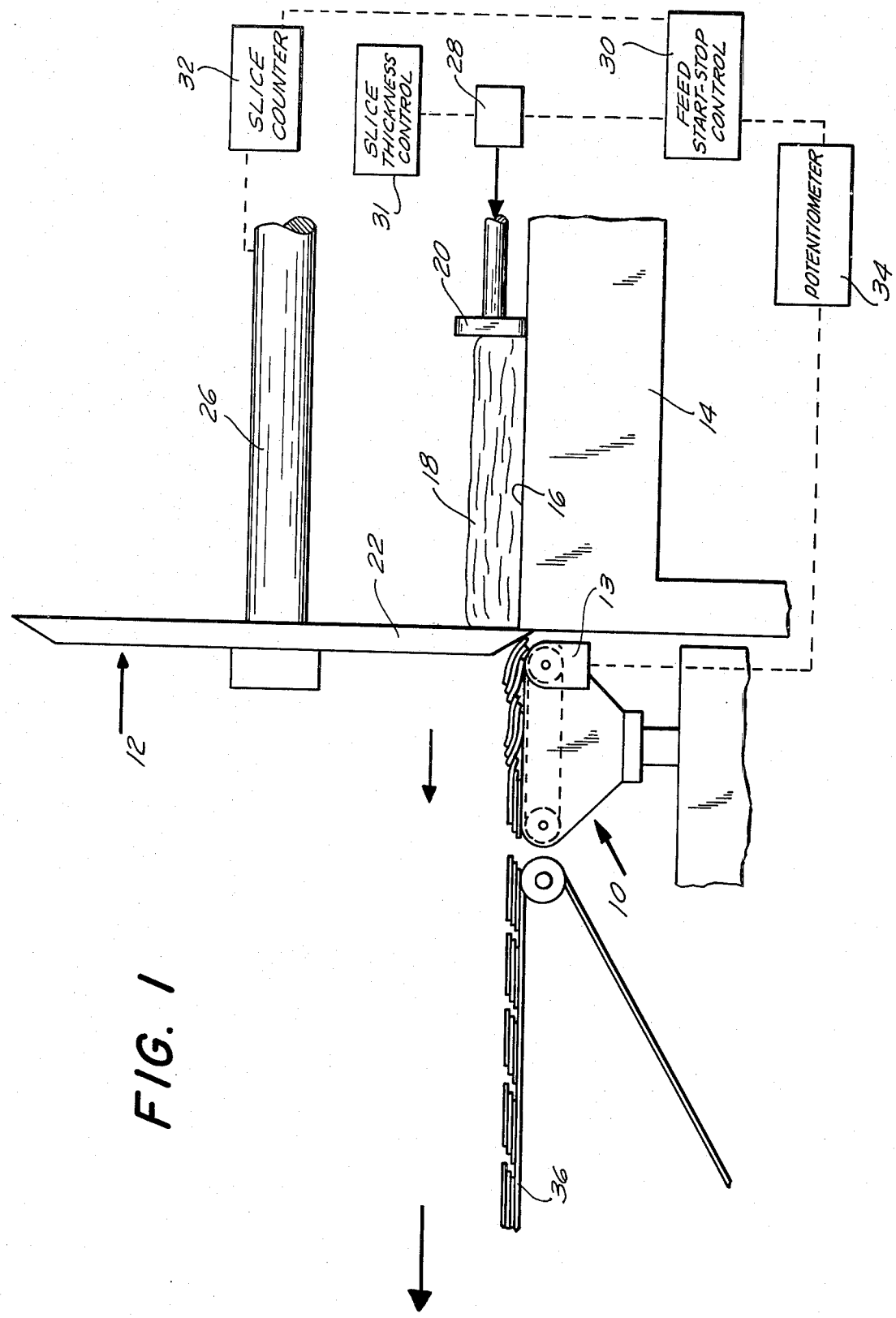
FIG. 1 is a fragmentary side elevational view of the apparatus of the present invention for slicing and separating drafts of shingled slices.
Figure 2:
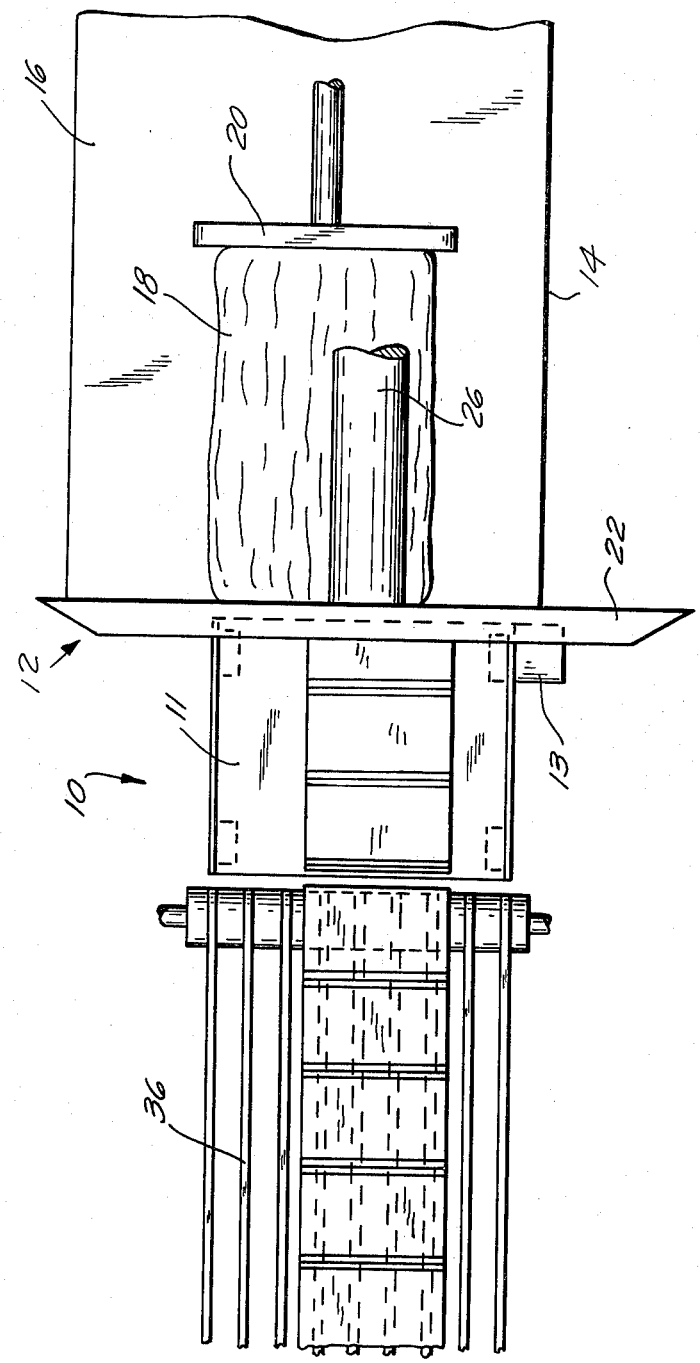
FIG. 2 is a top plan view thereof.

The illustrated slicing machine 12 to which the present invention is particularly applicable is one of a number usable in this invention. Thus, slicing machine 12 may assume the form disclosed in the aforementioned patents and may be the slicing machine available commercially under the Hydro-Matic Slicer which is fully disclosed in the operating instructions for the ANCO No. 827 or 827C Hydro-Matic Bacon Slicer, available from the manufacturer, the Allbright-Nell Company of Chicago, Ill. For this reason, the slicing machine 12 will not be described in detail and for a more complete explanation thereof, reference should be made to the foregoing references.

Sufficient to say, the slicing machine 12 comprises a supporting table 14 having a platen or feed bed 16 over which the product, such as processed meat, shown at 18, is fed by a feeder or pusher 20 to the slicing blade 22. The product is sliced by the blade 22 and then discharged on to the motorized conveyor 10. Normally the forward or leading edge of the meat product 18 is pressed downwardly against the bed 16 so as to properly engage the blade 22. This may be accomplished by means of a spring pressure plate (not shown) suitably supported adjacent the blade 22. This blade is also encased in a housing (not shown) which serves to protect the operator and also prevents the particles of sliced product from being thrown outwardly from the blade by centrifugal force. In the identified commercially available slicing machines the blade 22 is rotary and is in the form of an eccentric or involute disc which revolves at relatively high speeds. The portion of the blade 22 having the greatest radius serves to slice the edge of the product 18, with the portion of the blade having a minimum radius providing clearance for the product to be fed outwardly thereby permitting the initiation of the next slicing cycle.

Product 18 is continuously fed forwardly by the pusher 20. The feed mechanism may be of the type disclosed in the aforesaid commonly assigned patents or commercial machine. When the pusher 20 feeds the product 18 forwardly at a relatively high rate of speed, the thickness of the slices increases, and when it operates at a relatively low rate of speed the thickness of the slice is reduced.

The blade 22 is mounted at the end of a rotatable shaft 26 and this shaft in turn may be driven by mechanism of the type disclosed in the above patents. Reference should also be made to these references for a complete description of hydraulic circuitry normally associated with the slicing machine 12.

The pusher 20 is reciprocated by a hydraulic cylinder-piston assembly 28. This reciprocation is controlled by a motorized flow control valve 30 forming part of the hydraulic circuitry disclosed in the aforementioned references. In one position of this valve 30, the piston of the assembly 28 and consequently pusher 20 will shift to the left as viewed in FIG. 1 so as to feed the meat product 18 forwardly to be sliced by the blade 22. When the product 18 has been shifted to the left so that all of it has been sliced, the piston of assembly 28 together with the pusher 20 are automatically retracted upon actuation of the valve 30 to a second retracted position and thereafter another feeding cycle is initiated.

A slice thickness control 31 is provided for increasing or decreasing the rate of travel of the pusher 20 to consequently increase and decrease the slice thickness, respectively. Slice thickness control is disclosed in detail in U.S. Pat. Nos. 3,099,304 granted July 30, 1963; 3,200,864 granted Aug. 17, 1965; and 3,204,676 granted Sept. 7, 1965, and pending U.S. Pat. application Ser. No. 282,651 filed Aug. 22, 1972.

The feed mechanism may also be of the type disclosed in commonly assigned application entitled "Improved Continuous Feed Bacon Slicer" filed on Oct. 10, 1973 under Ser. No. 404,853.

In order to achieve a more uniform slice count per unit weight package, whether one half pound or pound, regardless of cross-sectional size of product, an overriding slice thickness control may be imposed of the type commercially available under the name Slice-Master available from its supplier, Cashin Systems Corp. of Williston Park, N.Y. Systems of a similar nature are disclosed in detail in U.S. Pat. Nos. 2,642,910 granted June 23, 1953; 2,768,666 granted Oct. 30, 1956; 2,966,186 granted Dec. 27, 1960; 3,105,533 granted Oct. 1, 1963; 3,131,739 granted May 5, 1964 and 3,144,893 granted Aug. 18, 1964.

The belt 11 of the motorized conveyor 10 is adapted to receive the slices from the machine 12 and arrange them in shingle fashion and segregate them into groups or drafts of any pre-determined number of shingled slices. This belt is run normally at a very low speed which causes the slices to pile on top of one another in a very tight shingle. The slicer is provided with a slice counter 32 which is governed by the revolutions of the shaft 26. A counter contemplated by this invention is disclosed in commonly assigned U.S. Pat. No. 3,099,304 granted July 30, 1963, U.S. Pat. No. 3,200,864 granted Aug. 17, 1965 and U.S. Pat. No. 3,204,676 granted Sept. 7, 1965. When the counter 32 senses that a predetermined number of slices, i.e. a draft of three, has been accomplished, it goes into "space time" for a predetermined number of revolutions, i.e. the equivalent of two slices. During this space time interval the piston assembly 28 stops the feed of the product to the slicer and the speed of the motorized conveyor 10 is jumped ahead to "high speed" determined by the potentiometer 34 by increasing the speed of motor 13. This "high speed" remains "on" for the entire space time cycle and reverts to "shingle" when the "slice" signal is received and the space time cycle is ended. During this space time cycle the conveyor will jump approximately 2.75 inches during a two space cycle on a 930 RPM slicer in a successful embodiment of the present invention. This jump of the conveyor will serve to form spaces between the three slice drafts on the belt of the motorized conveyor.

Cooperating with the motorized conveyor 10 is a continuously moving conveyor belt 36 run at a faster speed than the normally low speed belt 11 of the motorized conveyor. Such difference in speeds between the belts 11 and 36 serves to completely separate the three slice drafts from each other on the belt 36. This greatly facilitates removal of the drafts from the belt for packaging and marketing.

Thus the several aforenoted objects and advantages are most effectively attained. Although a single somewhat preferred embodiment has been disclosed and described in detail herein, it should be understood that this invention is in no sense limited thereby and its scope is to be determined by that of the appended claims.

I claim:
1. The combination of
   a. a slicing machine having:
      a slicing blade;
      feed mechanism for feeding products to be sliced into the blade;
      a first control for interrupting the operation of the feed mechanism; and
   b. receiving and conveying apparatus for receiving the sliced products from the slicing machine and conveying the sliced products away comprising:
      a motorized conveyor normally run at low speed and adapted and positioned to receive a plurality of drafts of the sliced product from the slicing machine in shingled fashion, said motorized conveyor having means to be jumped ahead at high speed to form separations between the drafts on the motorized conveyor;
      a second control for jumping the motorized conveyor ahead at high speed;
      a third control for counting the revolutions of the slicing blade, the said third control being interconnected to the first and second controls to permit a draft of a predetermined number of slices to be fed onto the motorized conveyor in shingled fashion, the feed mechanism to be interrupted for a predetermined number of revolutions of the slicing blade, and the motorized conveyor to be jumped ahead at high speed during the interruption of the feed mechanism, whereby the drafts of shingled slices on the motorized conveyor will have separations between drafts.

2. The invention in accordance with claim 1, wherein a second conveyor is positioned to receive the separated drafts from the motorized conveyor.

3. The invention in accordance with claim 2, wherein the second conveyor is run at a higher speed than the normal low speed of the motorized conveyor, the higher speed of the second conveyor causing the drafts to be completely separated on the second conveyor to facilitate removal of the drafts for packaging and marketing.

4. The method of slicing food products comprising:
   feeding food products to be sliced into the blade of a slicing machine;
   receiving and collecting a first draft of a predetermined number of slices on a low speed first conveyor;
   interrupting the feed of the sliced product into the slicing blade and jumping the said first conveyor ahead to high speed for a predetermined number of revolutions of the slicing blade; and
   resuming the feed and returning the first conveyor to low speed to feed a second draft having the same number of slices as the first draft onto the said first conveyor next to the first draft, the said second draft being thereby adjacent but separated from the first draft on the first conveyor.

5. The method of claim 4, wherein the separated drafts of sliced product are fed onto a second conveyor running at a higher speed than the low speed of the first conveyor, whereby the higher speed of the second conveyor will cause the drafts to be completely separated on the second conveyor to facilitate removal of the drafts for packaging and marketing.

* * * * *